(12) United States Patent
Park et al.

(10) Patent No.: US 12,368,611 B2
(45) Date of Patent: Jul. 22, 2025

(54) METHODS AND SYSTEMS FOR SYNCHROPHASING USING ASYNCHRONOUS BUSES

(71) Applicant: HONEYWELL INTERNATIONAL INC., Charlotte, NC (US)

(72) Inventors: Sean Park, Phoenix, AZ (US); Ryan Sterbenz, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 215 days.

(21) Appl. No.: 18/181,215

(22) Filed: Mar. 9, 2023

(65) Prior Publication Data

US 2024/0305499 A1 Sep. 12, 2024

(51) Int. Cl.
*H04L 12/40* (2006.01)

(52) U.S. Cl.
CPC .... *H04L 12/40* (2013.01); *H04L 2012/40215* (2013.01); *H04L 2012/4028* (2013.01)

(58) Field of Classification Search
CPC .......... H04L 12/40; H04L 2012/40215; H04L 2012/4028
See application file for complete search history.

(56) References Cited

U.S. PATENT DOCUMENTS

| | | | |
|---|---|---|---|
| 4,472,780 A | 9/1984 | Chenoweth et al. | |
| 4,644,538 A | 2/1987 | Cooper et al. | |
| 5,453,943 A | 9/1995 | Magliozzi | |
| 5,493,497 A | 2/1996 | Buus | |
| 6,860,452 B2 | 3/2005 | Bacon et al. | |

(Continued)

FOREIGN PATENT DOCUMENTS

| | | |
|---|---|---|
| EP | 076973 B1 | 8/2001 |
| EP | 3254960 A1 | 12/2017 |

(Continued)

OTHER PUBLICATIONS

Misol, M., "Full-Scale Experiments on the Reduction of Propeller-Induced Aircraft Interior Noise with Active Trim Panels," Applied Acoustics, Oct. 25, 2019.

(Continued)

*Primary Examiner* — Henry Tsai
*Assistant Examiner* — Christopher A Daley
(74) *Attorney, Agent, or Firm* — Lorenz & Kopf LLP

(57) ABSTRACT

Vehicle systems and methods are provided for synchronizing control modules over a communications bus for synchrophasing propellers. A vehicle electrical system includes a communications bus, a bus control module to transmit a first message over the communications bus, a vehicle control module coupled to the bus control module to identify a first timestamp associated with the first message being transmitted in a first clock domain associated with the vehicle control module and provide a subsequent message to the bus control module including the first timestamp, and an actuator control module coupled to the communications bus to identify a second timestamp associated with the first message being received over the communications bus and determine an adjustment to synchronize a second clock domain associated with the actuator control module with the first clock domain based at least in part on a relationship between the first timestamp and the second timestamp.

20 Claims, 5 Drawing Sheets

(56) References Cited

U.S. PATENT DOCUMENTS

| | | | |
|---|---|---|---|
| 6,914,914 B1* | 7/2005 | Flood | G05B 19/054 |
| | | | 370/503 |
| 7,031,810 B2 | 4/2006 | Foch et al. | |
| 7,337,044 B2 | 2/2008 | Platzer et al. | |
| 7,611,329 B2 | 11/2009 | Nouhaud | |
| 8,538,602 B2 | 9/2013 | Brot | |
| 8,690,101 B2 | 4/2014 | Ahmad et al. | |
| 9,873,505 B2 | 1/2018 | Bara et al. | |
| 9,932,108 B1* | 4/2018 | Viele | B64U 50/13 |
| 10,730,609 B2 | 8/2020 | Baran | |
| 11,095,382 B2 | 8/2021 | Yoneda et al. | |
| 11,097,834 B2* | 8/2021 | Wilkens | G06F 13/4004 |
| 11,155,341 B2 | 10/2021 | Wilkens | |
| 11,502,765 B2* | 11/2022 | Ferdowsi | H04J 3/0697 |
| 11,907,143 B2* | 2/2024 | Zhao | G06F 13/24 |
| 2006/0100750 A1 | 5/2006 | Platzer et al. | |
| 2017/0050588 A1 | 2/2017 | Hammerschmidt | |
| 2017/0109297 A1 | 4/2017 | Chang et al. | |
| 2017/0220502 A1 | 8/2017 | Kessler et al. | |
| 2017/0355449 A1 | 12/2017 | Bapat | |
| 2019/0036732 A1 | 1/2019 | Dormiani et al. | |
| 2020/0065284 A1 | 2/2020 | Noll | |
| 2020/0186386 A1 | 6/2020 | Hartwich et al. | |
| 2021/0276692 A1 | 9/2021 | Hutchinson et al. | |
| 2024/0085938 A1* | 3/2024 | Abdelhameed | G06F 1/04 |

FOREIGN PATENT DOCUMENTS

| | | |
|---|---|---|
| WO | 9529434 A1 | 11/1995 |
| WO | 2018234006 A1 | 12/2018 |
| WO | 2019-232535 A1 | 12/2019 |

OTHER PUBLICATIONS

B. Dolega & P. Rzucidlo (2007) Controllers for fault tolerant actuators, Aviation, 11:1, 23-27.

XP055511612; Forian Hartwich et al. "CAN frame time-stamping—supporting Autosar time base synchronization", CAN in Automation (CIA), ICC Mar. 7, 2017; pp. 04-1; Nuremberg (DE) p. 1-p. 2; Figure 1.

XP055506657: Autostar Aug. 12, 2017; Retrieved from the internet: URL:https://www.autosar.org/fileadmin/user_upload/standards/classic/4-3/AUTOSAR_SWS_TimeSyncOverCAN.pdf; Retrieved on Sep. 12, 2018; pp. 5, 21; Figures 1,4.

* cited by examiner

METHODS AND SYSTEMS FOR SYNCHROPHASING USING ASYNCHRONOUS BUSES

TECHNICAL FIELD

The subject matter described herein relates generally to aircraft systems, and more particularly, embodiments of the subject matter relate to synchrophasing propellers for aircraft having fly-by-wire systems using asynchronous buses.

BACKGROUND

In some modern aircraft, traditional mechanical flight control systems have been replaced with electrically controlled actuators, often referred to as fly-by-wire. Instead of mechanical linkages between cockpit controls and flight control components, electrical signals are utilized to communicate movements of cockpit controls to actuators for the flight control components. Fly-by-wire systems are often designed for safety and reliability, which may result in design choices that can complicate achieving various performance objectives. To this end, it is desirable to provide a resilient fly-by-wire system that is capable of accurately controlling propellers, rotors or other flight control components for synchrophasing or other higher speed applications requiring synchronicity at relatively higher frequencies while using lower frequency communications buses. Other desirable features and characteristics will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an exemplary embodiment, an electrical system suitable for use with a vehicle is provided. The electrical system includes a communications bus, a bus control module coupled to the communications bus to transmit a first message over the communications bus and provide an indication of the first message being transmitted, a first control module coupled to the bus control module to identify a first timestamp associated with the indication in a first clock domain associated with the first control module and provide a subsequent message to the bus control module including the first timestamp, and a second control module coupled to the communications bus to identify a second timestamp associated with the first message being received over the communications bus, identify the first timestamp contained in the subsequent message, and determine an adjustment to synchronize a second clock domain associated with the second control module based at least in part on a relationship between the first timestamp and the second timestamp.

In another embodiment, a method is provided that involves receiving, by a first control module coupled to an asynchronous bus, a first synchronization message over the asynchronous bus from a second control module coupled to the asynchronous bus, identifying, by the first control module, a first timestamp associated with receipt of the first synchronization message in a first clock domain associated with the first control module, receiving, by the first control module, a second synchronization message over the asynchronous bus from the second control module, the second synchronization message including a second timestamp associated with transmission of the first synchronization message in a second clock domain associated with the second control module, and determining, by the first control module, an adjustment to synchronize the first clock domain with the second clock domain based on a relationship between the first timestamp and the second timestamp.

In yet another embodiment, an apparatus is provided for a non-transitory computer-readable medium is provided. The computer-readable medium has computer-executable instructions stored thereon that, when executed by a processing system, cause the processing system to identify a first timestamp in a first clock domain associated with a first control module corresponding to transmission of a synchronization message over an asynchronous bus, identify a second timestamp in a second clock domain associated with a second control module corresponding to receipt of the synchronization message over the asynchronous bus, and determine an offset to synchronize the second clock domain with the first clock domain based on a relationship between the first timestamp and the second timestamp, resulting in an adjusted reference time in the second clock domain, wherein an actuator coupled to the second control module is operated in accordance with the adjusted reference time.

Furthermore, other desirable features and characteristics of the subject matter described herein will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to electrically controlled vehicle systems. For purposes of explanation, the subject matter is described herein primarily in the context of aircraft where flight control components, such as propellers, rotors or the like, are controlled using electrical signals, however, the subject matter is not necessarily limited to use with aircraft and may be implemented in an equivalent manner for other types of vehicles (e.g., automotive vehicles, marine vessels, or the like).

Figure 1:
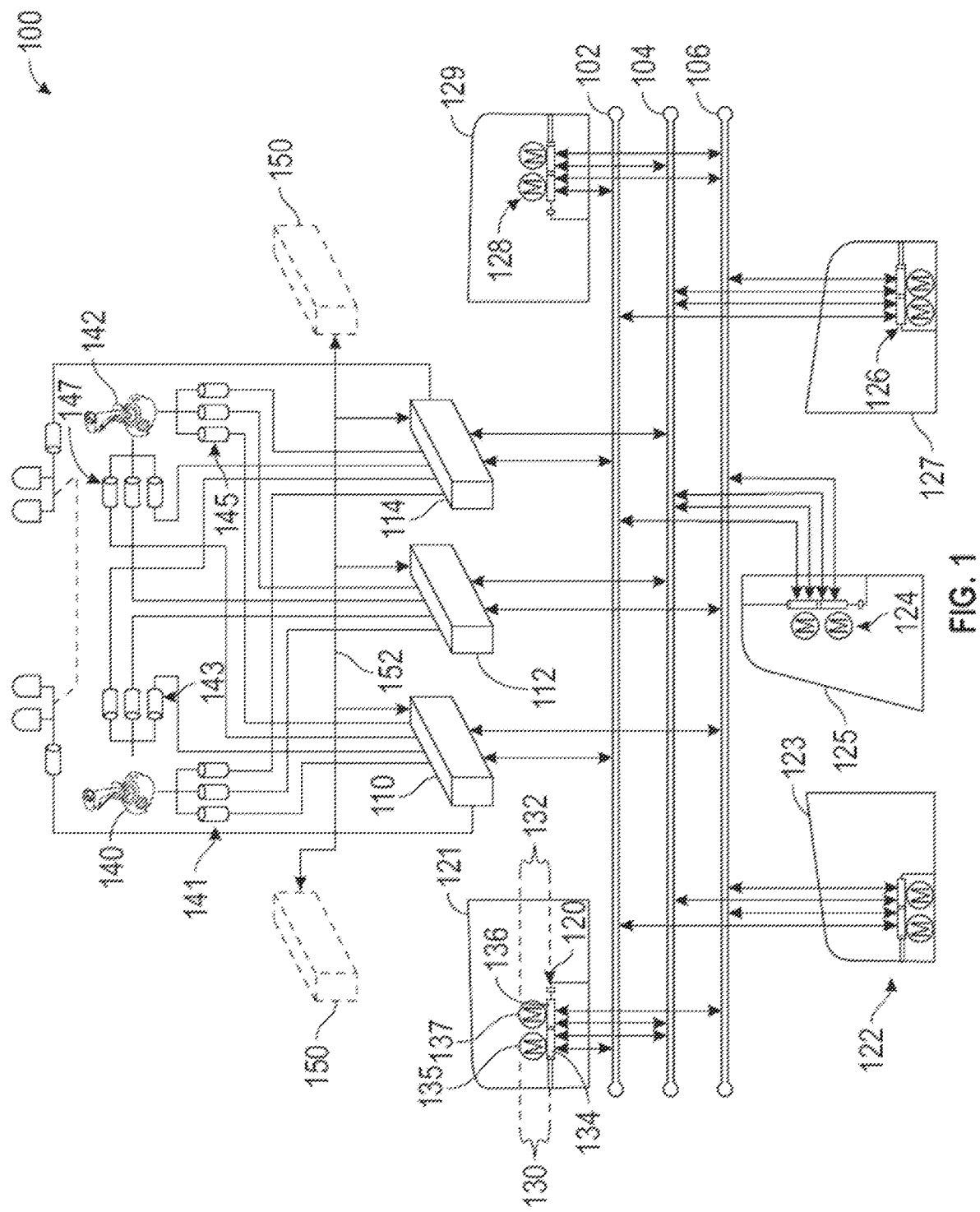
FIG. 1 is a block diagram illustrating a suitable for use with an fly-by-wire system aircraft in accordance with one or more exemplary embodiments.

FIG. 1 depicts an exemplary embodiment of a fly-by-wire system 100 including a plurality of communications buses 102, 104, 106, a plurality of flight control modules 110, 112, 114, and a plurality of actuation systems 120, 122, 124, 126, 128 associated with a plurality of flight control components 121, 123, 125, 127, 129. In the illustrated embodiment, the first flight control module 110 is coupled to a first subset of the buses (e.g., buses 102 and 106), the second flight control module 112 is coupled to a second subset of the buses (e.g., buses 104 and 106), and the third flight control module 114 is coupled to a third subset of the buses (e.g., buses 102 and 104), with each of the subsets of buses being unique, distinct, or otherwise different from one another. In other words, none of the flight control modules 110, 112, 114 are coupled to a common subset of the buses 102, 104, 106, and each of the flight control modules 110, 112, 114 is isolated from at least one of the buses 102, 104, 106 by the absence of a physical electrical connection with the respective isolated bus 102, 104, 106 (e.g., the first flight control module 110 is isolated from the second bus 104, the second flight control module 112 is isolated from the first bus 102, and the third flight control module 114 is isolated from the third bus 106).

In the illustrated embodiment, the actuation systems 120, 122, 124, 126, 128 include at least a pair of redundant actuation arrangements, with each actuation arrangement including an actuator control module and a corresponding actuator associated therewith. For example, a first actuation arrangement 130 of the first actuation system 120 includes a first actuator control module 134 that is coupled to or otherwise configured to control operation of a first actuator 135, such as a motor, that is capable of adjusting a position or orientation of the first flight control component 121. A second actuation arrangement 132 of the first actuation system 120 includes a second actuator control module 136 that is coupled to or otherwise configured to control operation of a second actuator 137 that is similarly capable of adjusting the position or orientation of the first flight control component 121. Each actuation arrangement of the actuation systems 120, 122, 124, 126, 128 is coupled to a distinct or unique subset of the buses 102, 104, 106 relative to other actuation arrangements of the respective actuation system 120, 122, 124, 126, 128. For example, the first actuator control module 134 of the first actuation arrangement 130 is coupled to a first subset of the buses (e.g., buses 102 and 104) that is different from a second subset of buses (e.g., buses 104 and 106) that are coupled to the actuator control module 136 of the second actuation arrangement 132. In exemplary embodiments, each of the actuator control modules 134, 136 is coupled to all of the flight control modules 110, 112, 114 via its respective subset of buses 102, 104, 106 it is connected to, thereby achieving a desired level of redundancy without triplicate bus connections or interfaces for either the actuator control modules 134, 136 or the flight control modules 110, 112, 114. At the same time, in exemplary embodiments, each of the actuator control modules 134, 136 of a respective actuation system 120, 122, 124, 126, 128 is isolated from at least one of the buses 102, 104, 106 by the absence of a physical electrical connection with the respective isolated bus 102, 104, 106 (e.g., the first actuator control module 134 is isolated from the third bus 106 and the second actuator control module 136 is isolated from the first bus 102).

The flight control modules 110, 112, 114 generally represent the processing system, processing device, hardware, circuitry, logic, software, firmware and/or other components configured to receive signals indicative of a sensed or measured position, orientation, or adjustment to user interface devices 140, 142 in the cockpit of the aircraft and convert the inputs or adjustments received at the user interface devices 140, 142 into corresponding command signals for one or more flight control components 121, 123, 125, 127, 129 and output or otherwise provide the command signals to the one or more flight control components 121, 123, 125, 127, 129 via the subset of buses 102, 104, 106 that the respective flight control module 110, 112, 114 is coupled to. For purposes of explanation, the flight control modules 110, 112, 114 may alternatively be referred to herein as flight control computers. Each flight control computer 110, 112, 114 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 110, 112, 114 may include or access a data storage element (or memory) capable of storing programming instructions for execution that, when read and executed by the flight control computer 110, 112, 114, cause the flight control computer 110, 112, 114 to support operations of the fly-by-wire system 100.

The cockpit user interface devices 140, 142 onboard the aircraft could be realized as a keypad, touchpad, keyboard, mouse, touch panel (or touchscreen), joystick, knob, line select key or another suitable device adapted to receive input from a user. In the illustrated embodiment, the cockpit user interface devices 140, 142 are realized as joysticks including respective sets of redundant sensors 141, 145 configured to sense the position of a respective joystick 140, 142 in a first reference direction (e.g., a horizontal or x-reference direction) and additional sets of sensors 143, 147 configured to sense the position of the respective joystick 140, 142 in a second reference direction (e.g., a vertical or y-reference direction). Each sensor of each set 141, 143, 145, 147 is coupled to a respective one of the flight control computers 110, 112, 114.

One or more avionics systems 150 are also communicatively coupled to each of the flight control computers 110, 112, 114 via a data bus 152. The avionics systems 150 support navigation, flight planning, and other aircraft control functions in a conventional manner and provide real-time data and/or information regarding the operation of the aircraft to the flight control computers 110, 112, 114 for analysis in conjunction with the sensed user interface device data received from the sensors 141, 143, 145, 147. Practical embodiments will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system.

Based on the data or information received from the respective avionics systems 150 and the sensed position or adjustment to a respective user interface device 140, 142, each of the flight control computers 110, 112, 114 redundantly determines commands for controlling the position of or otherwise operating one or more of the flight control components 121, 123, 125, 127, 129. In this regard, the flight control components 121, 123, 125, 127, 129 generally represent the propellers, rotors or other aerodynamic devices capable of adjusting the attitude of the aircraft. The actuator control modules 134, 136 of the respective actuation systems 120, 122, 124, 126, 128 generally represent the processing system, processing device, hardware, circuitry, logic, software, firmware and/or other components of the respective actuation systems 120, 122, 124, 126, 128 that are capable of receiving a command for the respective flight control components 121, 123, 125, 127, 129 and generating corresponding commands for operating the motor or other actuator 135, 137 associated therewith to adjust or otherwise control the position of the respective flight control component 121, 123, 125, 127, 129 to track the commands provided by one or more of the flight control computers 110, 112, 114. In this regard, the actuator control modules 134, 136 may be implemented or realized using any suitable processing system and/or device, such as, for example, one or more processors, central processing units (CPUs), controllers, microprocessors, microcontrollers, processing cores and/or other hardware computing resources configured to support the operation described herein.

In exemplary embodiments, each of the buses 102, 104, 106 is realized as a Controller Area Network (CAN) bus, with each of the flight control computers 110, 112, 114 and actuation systems 120, 122, 124, 126, 128 including (or being coupled to a respective CAN bus 102, 104, 106 via) a respective CAN controller, a CAN transceiver (or similar communications interface). For example, a first actuation control module 134 may include or be coupled to a first CAN controller that is coupled to the first CAN bus 102, and also include or be coupled to a second CAN controller that is coupled to the second CAN bus 104. Similarly, the first flight control computer 110 may include or be coupled to a first CAN controller that is coupled to the first CAN bus 102, and include or be coupled to a second CAN controller that is coupled to the third CAN bus 106.

During operation of the aircraft, each of the flight control computers 110, 112, 114 continually analyzes the outputs of the user interface sensors 141, 143, 145, 147 and the onboard avionics systems 150 to determine corresponding commands for how the respective flight control components 121, 123, 125, 127, 129 should be operated in response to adjustments or changes to the user interface devices 140, 142 substantially in real-time. For each respective flight control component 121, 123, 125, 127, 129, each of the flight control computers 110, 112, 114 generates a corresponding actuation command that is encoded into a CAN message having a header that identifies the appropriate actuation system 120, 122, 124, 126, 128 and/or flight control component 121, 123, 125, 127, 129 as the intended recipient for that command, and each of the flight control computers 110, 112, 114 outputs, transmits, or otherwise provides the resultant message to the respective subset of CAN buses 102, 104, 106 that respective flight control computer 110, 112, 114 is connected to. The actuator control modules 134, 136 of each of the actuation systems 120, 122, 124, 126, 128 continually monitors the respective subset of CAN buses 102, 104, 106 connected thereto for messages identifying its associated flight control component 121, 123, 125, 127, 129 as the intended recipient. In response to identifying a message intended for its associated flight control component 121, 123, 125, 127, 129, the actuator control module 134, 136 decodes, parses, or otherwise analyzes the message to identify the commanded adjustment or position for its associated flight control component 121, 123, 125, 127, 129 and generates corresponding motor commands for operating a motor 135, 137 to achieve the commanded adjustment to the flight control component 121, 123, 125, 127, 129. In exemplary embodiments, a cyclic redundancy check (CRC) or similar coding schemes may be utilized to protect against communications errors and improve or ensure the integrity of the messages received by the actuator control modules 134, 136.

The subject matter described herein in the context of FIG. 1 provides independent communication paths that achieve relatively high availability by maintaining support for communications between at least one flight control computer and all of the flight control components in the event of an adverse condition or another anomaly or problem with respect to two or more other flight control computers. It should be noted that although FIG. 1 depicts a fly-by-wire system 100 that includes three buses 102, 104, 106, three flight control computers 110, 112, 114, and two actuation arrangements 130, 132 per flight control component, it will be appreciated that the subject matter described herein is not necessarily limited to any particular number of buses, flight control computers, or actuation arrangements per flight control component. In this regard, other embodiments may include more or fewer than three buses, more or fewer than three flight control computers, and/or more or fewer than two actuation arrangements per flight control component, as may be desired to achieve a desired level of redundancy or reliability for a particular application.

Figure 2:
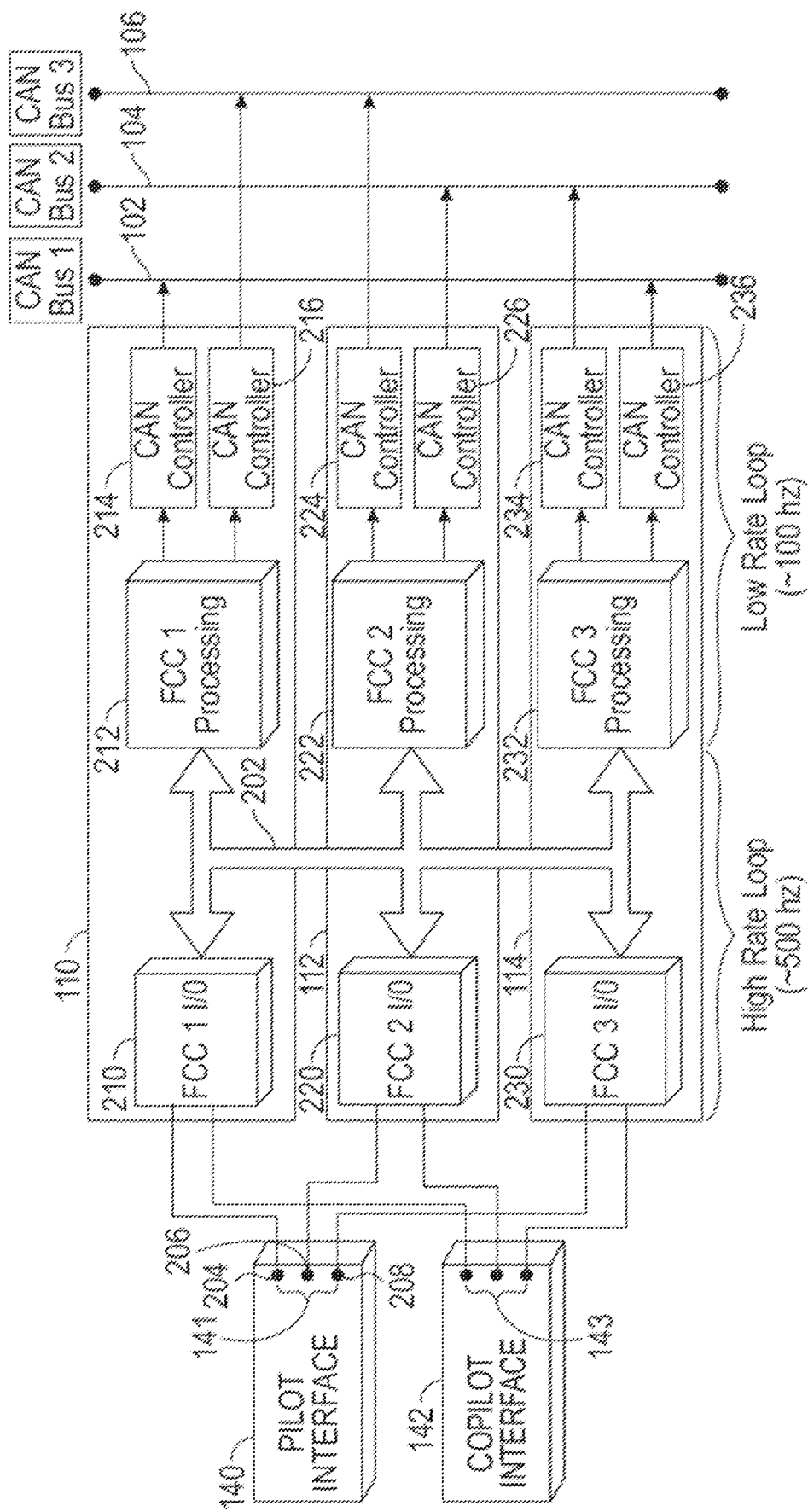
FIG. 2 is a block diagram of an electrical system suitable for use in the fly-by-wire system of FIG. 1 in an exemplary embodiment.

FIG. 2 depicts an exemplary embodiment of an electrical system suitable for use with the fly-by-wire system 100 of FIG. 1. The depicted electrical system provides relatively small, light, and low-cost architecture that supports fail operational redundancy. An asynchronous intermodule bus arrangement 202 is utilized to provide communications between input/output (I/O) interface arrangements 210, 220, 230 of the flight control modules 110, 112, 114 that enable sensor data to be shared among the flight control modules 110, 112, 114. For example, the I/O interface arrangement 210 of the first flight control module 110 is coupled to a first sensing arrangement 204 of a redundant set of sensors 141 associated with a user interface device 140 to receive signals indicative of a sensed or measured position, orientation, or adjustment to the user interface device 140 from the first sensing arrangement 204, while the I/O interface arrangement 220 of the second flight control module 112 is coupled to a second sensing arrangement 206 to receive signals indicative of a sensed or measured position, orientation, or adjustment to the user interface device 140 from the second sensing arrangement 206 and the I/O interface arrangement 230 of the third flight control module 114 is coupled to a third sensing arrangement 208 to receive signals indicative of a sensed or measured position, orientation, or adjustment to the user interface device 140 from the third sensing arrangement 208. The intermodule bus arrangement 202 is then utilized to communicate the sensor data from the second and third sensing arrangements 206, 208 received by the second and third I/O interface arrangements 220, 230 to the first I/O interface arrangement 210, while also being utilized to communicate the sensor data received by the first I/O interface arrangement 210 from the first sensing arrangement 204 to the second and third I/O interface arrangements 220, 230. Thus, each of the I/O interface arrangements 210, 220, 230 is capable of receiving or otherwise obtaining data from each of the redundant sensing arrangements 204, 206, 208 while only being connected to one of the sensing arrangements 204, 206, 208.

The I/O interface arrangements 210, 220, 230 generally represent the combination of analog-to-digital converters, demodulators, receivers, transmitters, and other interface circuitry configured to sample the output of a sensing arrangement 204, 206, 208 or otherwise obtain a sensor data value via the intermodule bus 202. In this regard, the intermodule bus 202 generally represents the wiring, cabling, traces, or other conductive elements utilized to establish communications between I/O interface arrangements 210, 220, 230. Example configurations of the intermodule bus 202 and the I/O interface arrangements 210, 220, 230 are described in greater detail in U.S. Pat. No. 11,097,834.

In exemplary embodiments, the I/O interface arrangements 210, 220, 230 are configured to sample the sensing arrangements 204, 206, 208 and communicate sensor data amongst one another via the intermodule bus arrangement 202 at a frequency that is greater than the rate at which the processing systems 212, 222, 232 obtain sensor data and determine corresponding actuation commands. For example, in one embodiment, the I/O interface arrangements 210, 220, 230 periodically obtain sensed data values from their respective sensing arrangement 204, 206, 208 or the other I/O interface arrangements 210, 220, 230 at a frequency of 500 Hz. In this regard, the I/O interface arrangements 210, 220, 230 operate at a greater frequency relative to the frequency associated with the processing systems 212, 222, 232 (e.g., 100 Hz). Thus, by virtue of the I/O interface arrangements 210, 220, 230 oversampling the sensor data relative to the frequency of the processing systems 212, 222, 232, the time delay or transport delay between when a sensed data value is obtained or captured and when it is processed by the processing systems 212, 222, 232 is reduced. For example, when the I/O interface arrangements 210, 220, 230 operate at 500 Hz and the processing systems 212, 222, 232 operate at 100 Hz, roughly four-fifths of the sensor data is discarded or otherwise not acted on by the processing systems 212, 222, 232, but the sensed data values obtained and acted on by the processing systems 212, 222, 232 have a maximum delay of 2 milliseconds between when a respective sensed data value was obtained and when it is processed.

Referring again to FIG. 2 with continued reference to FIG. 1, each of the flight control modules 110, 112, 114 includes a respective processing system 212, 222, 232 that is coupled to its respective I/O interface arrangement 210, 220, 230 to receive the sensor data corresponding to the sensing arrangements 204, 206, 208. Each respective processing system 212, 222, 232 is configured to generate or otherwise determine command signals for one or more flight control components 121, 123, 125, 127, 129 based on the sensor data indicative of the inputs or adjustments received at a user interface device 140 at a frequency that is less than the frequency at which its respective I/O interface arrangement 210, 220, 230 operates. For example, in one or more embodiments, the processing systems 212, 222, 232 obtain sensor data and generate actuator commands at a frequency of 100 Hz, while the I/O interface arrangements 210, 220, 230 obtain and communicate sensor data samples at a frequency of 500 Hz. In exemplary embodiments, each of the processing systems 212, 222, 232 is implemented or otherwise realized as a pair of lockstep processors configured to implement a control system in lockstep within a respective flight control module 110, 112, 114. In this regard, the lockstep processing improves reliability and integrity of the resulting actuator command by performing comparisons before, during and/or after processing of the sensor data by each of the components of the control system to ensure consistency. In one or more embodiments, in the event of any discrepancy, one of the processors may set a flag or otherwise mark or tag an actuator command with a validity indication set to indicate potential invalidity (e.g., by setting a validity bit position to a logical zero value).

Still referring to FIG. 2, each of the processing systems 212, 222, 232 provides the actuator command messages generated by the control system to the appropriate flight control component(s) 121, 123, 125, 127, 129 via the subset of buses 102, 104, 106 that the respective flight control module 110, 112, 114 is coupled to via its associated CAN control modules 224, 226, 234, 236, 244, 246. In this regard, the CAN control modules 224, 226, 234, 236, 244, 246 generally represent the components of the flight control modules 110, 112, 114 that are configured to encode actuator commands into a corresponding CAN message having a header that identifies the appropriate actuation system 120, 122, 124, 126, 128 and/or flight control component 121, 123, 125, 127, 129 as the intended recipient for that command and then outputs, transmits, or otherwise provides the resultant message to the CAN buses 102, 104, 106 that respective CAN control module is connected to, as described above. For example, the CAN control module 214 may encode an actuator command provided by the first processing system 212 into a CAN message addressed to the appropriate recipient and then transmit the CAN message containing that actuator command via the first CAN bus 102 connected to CAN control module 214, while CAN control module 216 similarly encodes the same actuator command provided by the first processing system 212 into a CAN message addressed to the same recipient and then transmits its generated CAN message via the respective CAN bus 106 connected to CAN control module 216.

It should be noted that although the subject matter may be described herein primarily in the context of sensor data associated with pilot inputs or other input received via user interface devices utilized to operate flight control surfaces in fly-by-wire aircraft, the subject matter described herein is not intended to be limited to sensor data or any particular type of sensing arrangement, and may be utilized in the context of other sensors (e.g., inertial reference sensors) or any other type of measurement or command data (e.g., flight plan data) that may be input to a flight control module for purposes of determining actuator commands. Additionally, the subject matter is not necessarily limited to use with aircraft and may be implemented in an equivalent manner in electrically controlled vehicle systems associated with other types vehicles (e.g., automotive vehicles, marine vessels, or the like).

Still referring to FIGS. 1-2, in exemplary embodiments, the flight control components 121, 123, 125, 127, 129 are realized as propellers (or rotors or the like), where the respective processing systems 212, 222, 232 of the flight control modules 110, 112, 114 generate or otherwise determine command signals for controlling the rotational velocity of the respective propellers 121, 123, 125, 127, 129 along with the phase angle (or phase angle offset) of each respective propeller 121, 123, 125, 127, 129 with respect to other ones of the propellers 121, 123, 125, 127, 129, alternatively referred to herein as synchrophasing. In this regard, controlling the relative phase relationships among the propellers 121, 123, 125, 127, 129 with a desired level of accuracy results in acoustic waves from the respective propellers 121, 123, 125, 127, 129 destructively interfering with one another to reduce the overall level of noise associated with the aircraft and/or to direct the noise in a desired direction in relation to the aircraft. For example, if propellers are arranged linearly, the optimum phase angle for maximizing destructive interference is 180° divided by the number of propeller blades (e.g., for multiple 5-bladed propellers arranged linearly, the desired phase angle offset is 36° relative to one another), where the allowable deviation or error in phase angle offset for achieving destructive interference is 60° divided by the number of propeller blades squared (e.g., 2.4°). Accordingly, it is desirable to accurately control the phase angle offset to achieve the desired level of noise reduction (e.g., a sound level that is less than 65 dBA).

Exemplary embodiments described herein facilitate accurately controlling and synchronizing the relative phase angle offset across different propellers while using an asynchronous bus, such as a CAN bus, that is relatively slow in relation to the rotational speed of the propellers, where in contrast to higher speed synchronous bus implementations, the uncertainty in the timing of messages communicated over an asynchronous bus and the lack of clock synchronization could otherwise impede the ability to accurately control the phase angle offset within the allowable amount of deviation given the rotational speed of the propellers. For example, for an example implementation where the CAN bus message length is 150 bits and the CAN bus data rate is 1 megabit per second (Mbps) (or a message rate of 6600 messages per second) and the rotational speed of the propellers is 100 Hz (or 36,000° per second), a synchronization error on the order of one CAN bus message (e.g., due to uncertainty over when the CAN bus message will be sent) corresponds to 150 microseconds of error or 5.4° of potential deviation or error in phase angle offset, which is greater than the tolerable amount of error (e.g., 2.4°) for the 5-bladed propeller example described above. In contrast, embodiments described herein enable synchronization over an asynchronous CAN bus with a synchronization error on the order of the CAN bus data rate (e.g., 1 microsecond of error), resulting in 0.036° of potential deviation or error in phase angle offset for propellers rotating at 100 Hz, which is less than the threshold amount of error of 2.4° for achieving destructive interference. In this regard, the subject matter described herein can achieve synchrophasing at relatively high propeller speeds (e.g., up to 2400 kHz for the 5-bladed propeller example described above) while using a relatively low speed asynchronous bus to achieve synchronicity of relative phase angle offsets across propellers.

Figure 3:
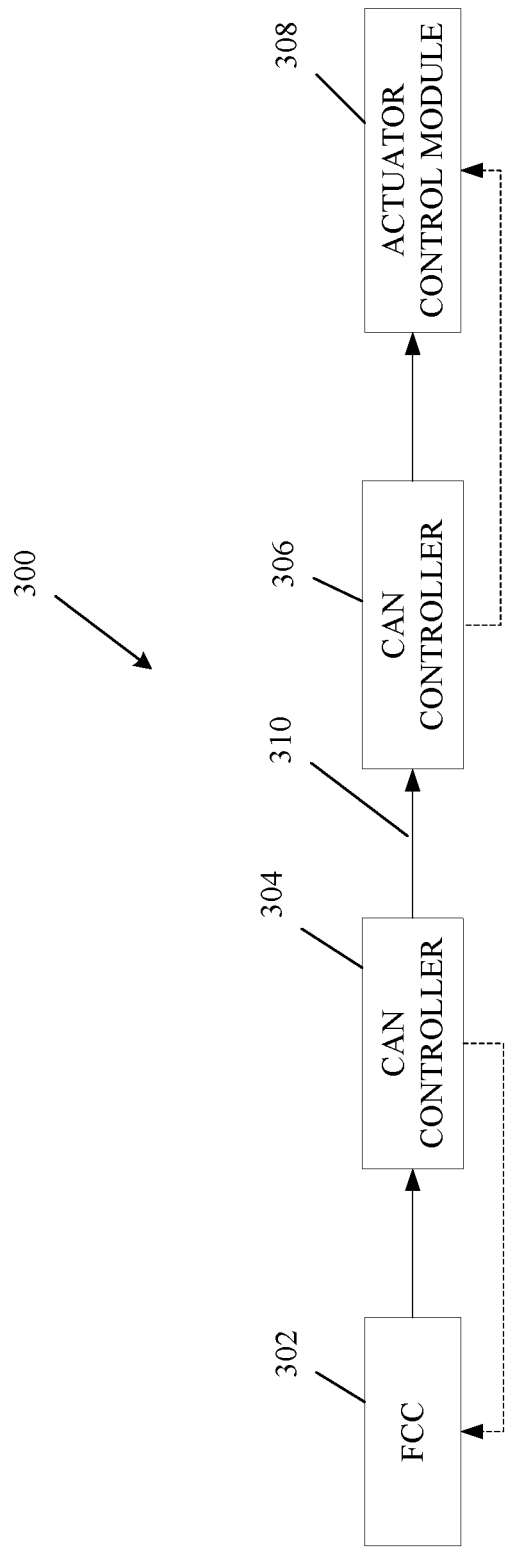
FIG. 3 is a block diagram of a synchronization system with an asynchronous bus suitable for use in the fly-by-wire system of FIG. 1 in an exemplary embodiment.

FIG. 3 depicts an exemplary synchronization system 300 suitable for implementation in a vehicle system (e.g., the fly-by-wire system 100 of FIG. 1) to achieve synchronization between different control modules 302, 308 that communicate via an asynchronous communications bus 310 (e.g., a CAN bus 102, 104, 106). In exemplary embodiments, the asynchronous communications bus 310 is realized as a CAN bus used to support communications between a flight control computer 302 (e.g., one of the flight control computers 110, 112, 114) and an actuator control module 308 (e.g., one of the actuator control modules 134, 136). The flight control computer 302 includes or is otherwise coupled to a CAN control module 304 (or CAN controller) that encodes actuator commands or other messages provided by the flight control computer 302 into corresponding CAN messages addressed to the appropriate recipient(s) and then asynchronously transmits the CAN messages via the asynchronous CAN bus 310. In a corresponding manner, the actuator control module 308 includes or is otherwise coupled to a CAN controller 306 that decodes actuator commands or other CAN messages that are addressed to the actuator control module 308 and provides the decoded messages to the actuator control module 308 for processing and/or execution.

While the exact timing of when a CAN message will be sent over the CAN bus 310 is uncertain due to the asynchronous nature of the CAN bus 310, the CAN controllers 304, 306 generate or otherwise provide an interrupt or other indication of when a CAN message is transmitted or received via the CAN bus 310. To effectively synchronize the actuator control module 308 with the flight control computer 302, the flight control computer 302 monitors a pin, terminal, port or other output interface of its associated CAN controller 304 for an interrupt bit or other indication of when a synchronization CAN message is sent and stores, records, or otherwise maintains indication of a timestamp associated with that interrupt according to the clock domain of the flight control computer 302. In a similar manner, the actuator control module 308 monitors a pin, terminal, port or other output interface of its associated CAN controller 306 for a corresponding interrupt bit or other indication of when a synchronization CAN message is received and stores, records, or otherwise maintains indication of a timestamp associated with that interrupt according to the clock domain of the actuator control module 308.

Thereafter, when the flight control computer 302 transmits a subsequent synchronization message, the flight control computer 302 populates the synchronization message with the respective local timestamp associated with the transmission of the preceding synchronization message in the local clock domain of the flight control computer 302. The actuator control module 308 receives the subsequent synchronization message from the flight control computer 302 and then automatically adjusts its local clock based on a difference between the recorded transmit time of the preceding synchronization message in the clock domain at the flight control computer 302 contained in the subsequent synchronization message and the recorded time for when the preceding synchronization message was received in the clock domain at the actuator control module 308. In this manner, the actuator control module 308 calculates or otherwise determines an offset to be applied to a current local time in the clock domain at the actuator control module 308 to obtain an adjusted time that is substantially synchronized with the clock domain at the flight control computer 302 to within a margin of error corresponding to the amount of time required for a bit of a CAN message to propagate from the transmitting CAN controller 304 to the CAN controller 306 (e.g., within 1 microsecond for a CAN bus data rate of 1 Mbps). In one or more implementations, the actuator control module 308 implements a counter, a timer, or similar feature that can be initialized with an adjusted time that is substantially synchronized with the clock domain at the flight control computer 302 and increments at the same rate or frequency as the clock domain at the flight control computer 302, such that the current value of the counter or timer at the actuator control module 308 corresponds to a system reference time that is maintained substantially equal to the local clock value at the flight control computer 302, subject to clock drift.

In exemplary embodiments, the flight control computer 302 sends an updated synchronization message on a periodic basis that includes the recorded transmit time of the preceding synchronization message in its clock domain, which, in turn, allows the actuator control module 308 to dynamically determine an updated offset amount to be applied to its local clock and thereby dynamically adjust the system reference time at the actuator control module 308 to maintain the reference time at the actuator control module 308 substantially equal to the current local time at the flight control computer 302 (e.g., within 1 microsecond plus or minus any clock drift since a preceding synchronization message for a CAN bus data rate of 1 Mbps). Accordingly, the flight control computer 302 may provide synchrophasing commands for operating the actuator associated with the actuator control module 308 to operate the propeller associated with the actuator control module 308 at a commanded rotational speed and a commanded phase angle offset at a particular point in time that is defined according to the clock domain at the flight control computer 302 with which the reference time at the actuator control module 308 is effectively synchronized.

Referring again to FIGS. 1-2 with continued reference to FIG. 3, in accordance with one or more embodiments, one of the flight control computers 110, 112, 114 is designated or otherwise assigned as the flight control computer 302 that functions as the master or reference timekeeper in the synchronization system 300 to which the different instances of actuator control modules 308 (e.g., the actuator control modules 134, 136 associated with the actuation systems 120 associated with the different flight control components 121, 123, 125, 127, 129) synchronize their respective local reference clock values. In this regard, while different actuator control modules 308 may receive a respective synchronization message at a different point in time (e.g., due to transmission delay or other variations), by using the different timestamps associated with the respective interrupts in their respective clock domain, the different actuator control modules 308 may determine different offset values by which to offset their respective local clocks, such that each of the different actuation control modules 308 locally maintains a system reference time (e.g., by adjusting its own local clock by the determined offset amount) that is substantially synchronized with the other actuator control modules 308 and the master reference time associated with the master flight control computer 302. By maintaining a reference time at each of the actuator control modules that is within the transmit time of a single bit on the asynchronous bus 310 (e.g., one microsecond), the commanded phase angle offsets of the different propellers associated with the actuator control modules 308 may be achieved within a threshold amount of accuracy or deviation relative to one another (e.g., within 2.4° of the commanded phase angle offset at a particular point in time) to achieve destructive interference while using a relatively low speed asynchronous bus 310.

Figure 4:
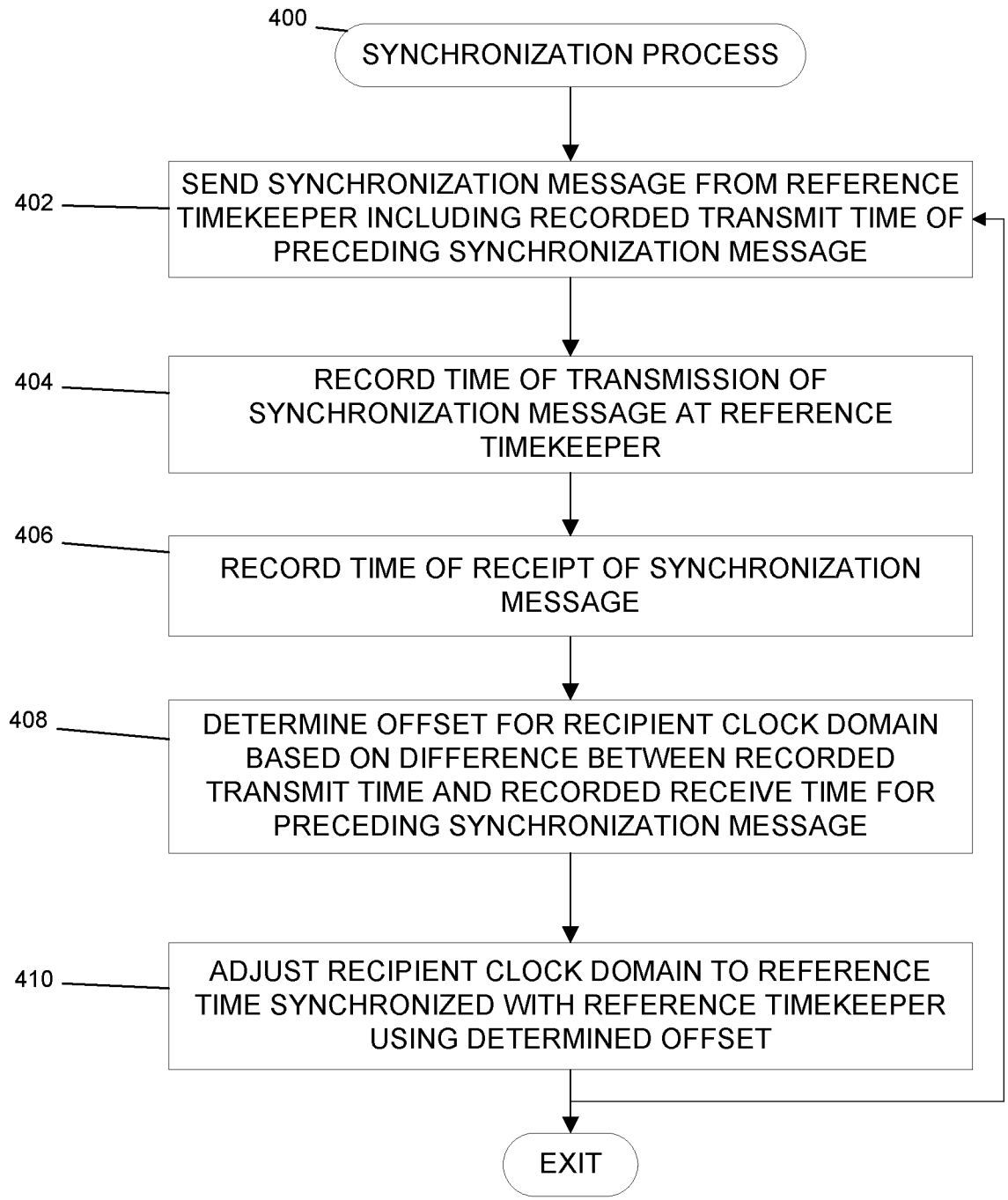
FIG. 4 is a flow diagram of a synchronization process suitable for use with an asynchronous bus in an exemplary embodiment.

FIG. 4 depicts an exemplary embodiment of a synchronization process 400 suitable for implementation in a fly-by-wire system or other vehicle system to achieve effective synchronization using an asynchronous bus. The various tasks performed in connection with the illustrated process may be implemented using hardware, firmware, software executed by processing circuitry, or any combination thereof. For illustrative purposes, the following description may refer to elements mentioned above in connection with FIGS. 1-3. In practice, portions of the synchronization process 400 may be performed by different elements of a fly-by-wire system 100. That said, exemplary embodiments are described herein in the context of the synchronization process 400 being primarily performed by at least one flight control computer 110, 112, 114, 302 and the actuator control modules 134, 136, 308. It should be appreciated that the synchronization process 400 may include any number of additional or alternative tasks, the tasks need not be performed in the illustrated order and/or the tasks may be performed concurrently, and/or the synchronization process 400 may be incorporated into a more comprehensive procedure or process having additional functionality not described in detail herein. Moreover, one or more of the tasks shown and described in the context of FIG. 4 could be omitted from a practical embodiment of the synchronization process 400 as long as the intended overall functionality remains intact.

The illustrated synchronization process 400 begins with the reference timekeeper sending a synchronization message that includes a recorded transmit time for when a preceding synchronization message from the reference timekeeper was transmitted over the asynchronous bus (task 402). In this regard, the payload of the synchronization message includes the recorded transmit time, in the local clock domain of the flight control computer 110, 302 that is acting as the master or reference for the system time, corresponding to the point in time when its CAN controller 304 generated an interrupt signal when a reference bit of the preceding synchronization message was transmitted over the CAN bus 310. For example, in some implementations, the reference bit may be realized as the initial bit of the preceding synchronization message, such that the interrupt signal indicates the time at the start of transmission of the preceding synchronization message, while in other implementations, the reference bit may be realized as the final bit of the preceding synchronization message, such that the interrupt signal indicates the time at which transmission of the preceding synchronization message was completed. Upon initialization or startup of the reference timekeeper flight control computer 110, 302, in the absence of a preceding synchronization message, the reference timekeeper flight control computer 110, 302 may transmit an initial synchronization message that includes a current value for the local time in the local clock domain of the reference timekeeper flight control computer 110, 302 (e.g., a timestamp associated with the initial synchronization message) or a dummy value in lieu of a recorded transmit time.

The synchronization process 400 continues with the reference timekeeper storing or otherwise recording the transmit time for the synchronization message when it is transmitted over the asynchronous bus (task 404). As described above, when the reference bit (e.g., the initial bit or the final bit) of the synchronization message sent by the reference timekeeper flight control computer 110, 302 (e.g., at task 402) is ultimately transmitted by the CAN controller 304 over the asynchronous CAN bus 310, the reference timekeeper CAN controller 304 may generate an interrupt signal that notifies the reference timekeeper flight control computer 110, 302 to record the current value of the counter, timer or other feature maintaining time in the local clock domain, thereby assigning a local timestamp in the reference timekeeper clock domain to the interrupt signal for when the synchronization message was actually transmitted.

The synchronization process 400 continues on the receiver side by the recipient recording, storing or otherwise maintaining the time of receipt of the synchronization message (task 406). As described above, when the reference bit of a synchronization message from the reference timekeeper flight control computer 110, 302 is received by a recipient CAN controller 306 from the asynchronous CAN bus 310, the recipient CAN controller 306 generates an interrupt signal that notifies the respective actuator control module 308 to record the current value of the counter, timer or other feature maintaining time in the local clock domain, thereby assigning a local timestamp in the actuator controller clock domain to the interrupt signal for when the synchronization message was actually received. For example, the actuator control module 308 may maintain (e.g., in a local data storage element or memory) a data entry that maintains an association between the local timestamp for when a synchronization message was received and the respective synchronization message.

The synchronization process 400 continues by with the actuator control module or other recipient of the synchronization message calculating or otherwise determining an offset for adjusting their local clock domain to synchronize with the reference timekeeper clock domain based on the difference between the recorded time of receipt for the preceding synchronization message and the recorded time of transmission for the preceding synchronization message indicated by the current synchronization message (task 408). In this regard, the actuator control module 308 analyzes the payload or other content of the synchronization message most recently received via the CAN bus 310 to identify the recorded transmit time, in the local clock domain of the reference timekeeper flight control computer 110, 302, when the preceding synchronization message was transmitted over the CAN bus 310. The actuator control module 308 obtains (e.g., from local data storage) the recorded receive time in the actuator controller clock domain associated with the preceding synchronization message. Based on the difference between the reference timekeeper transmit time value and the actuator controller receive time value, the actuator control module 308 calculates or otherwise determines an offset value for adjusting the value of the local clock to an adjusted value that is substantially synchronized with the reference timekeeper clock. For example, the actuator control module 308 may subtract the local timestamp value for receipt of the preceding synchronization message from the reference timekeeper timestamp value for transmission of the preceding synchronization message to obtain an offset value to be added to the current local time value to arrive at an adjusted time value substantially synchronized with the value of the clock at the reference timekeeper flight control computer 110, 302. It should be noted that for a distributed network where multiple different actuator control modules 308 may be communicatively coupled to a common CAN bus 310, the respective actuator control modules 308 may determine different offset amounts that vary depending on the respective value of their local clock.

After determining the offset amount, the synchronization process 400 continues by adjusting the local clock domain to a reference time that is substantially synchronized with the reference timekeeper using the determined offset (task 410). For example, based on the determined offset value and the current value of the clock, counter, timer or other component utilized for maintaining time in the local clock domain, the actuator control module 308 may calculate or otherwise determine an adjusted current time value that is substantially synchronized with the current time value for the clock at the reference timekeeper flight control computer 110, 302, and then initialize or otherwise reset a clock, counter, timer or other component at the actuator control module 308 that is configured to accrue at the same rate as the clock domain at the reference timekeeper flight control computer 110, 302 using the adjusted current time value. Thereafter, the various algorithms, control laws, or other software applications or services at the actuator control module 308 that are utilized to control that actuators may retrieve or otherwise reference the current value of that synchronized clock, counter or timer at the actuator control module 308, thereby synchronizing the algorithms, control laws, or other software applications or services implemented at the actuator control module 308 with the reference timekeeper clock domain. Thus, when the reference timekeeper flight control computer 110, 302 provides a synchrophasing actuation command that specifies a particular phase angle offset for a respective propeller at a particular point in time referenced to the clock domain at the reference timekeeper flight control computer 110, 302, the algorithms, control laws, or other software applications or services implemented at the actuator control module 308 responsible for operating the actuator(s) to achieve that phase angle offset may utilize the current value of that adjusted synchronized clock, counter or timer at the actuator control module 308 to synchronize the phase angle offset of the propeller with the commanded phase angle offset provided by the reference timekeeper flight control computer 110, 302.

In exemplary embodiments, the loop defined by tasks 402, 404, 406, 408 and 410 periodically repeats throughout operation of the aircraft or other vehicle to periodically update or adjust the clock, counter or timer at the actuator control module 308 to account for clock drift or other variations or deviations and maintain synchronization with the reference timekeeper flight control computer 110, 302 within a threshold margin of error for achieving destructive interference with propeller synchrophasing. For example, the synchronization process 400 may be repeated every second, every minute, and/or the like to periodically adjust the respective offsets at the respective actuator control modules 308 to maintain the adjusted clock values at the respective actuator control modules 308 in sync with the reference timekeeper clock value over time.

Figure 5:
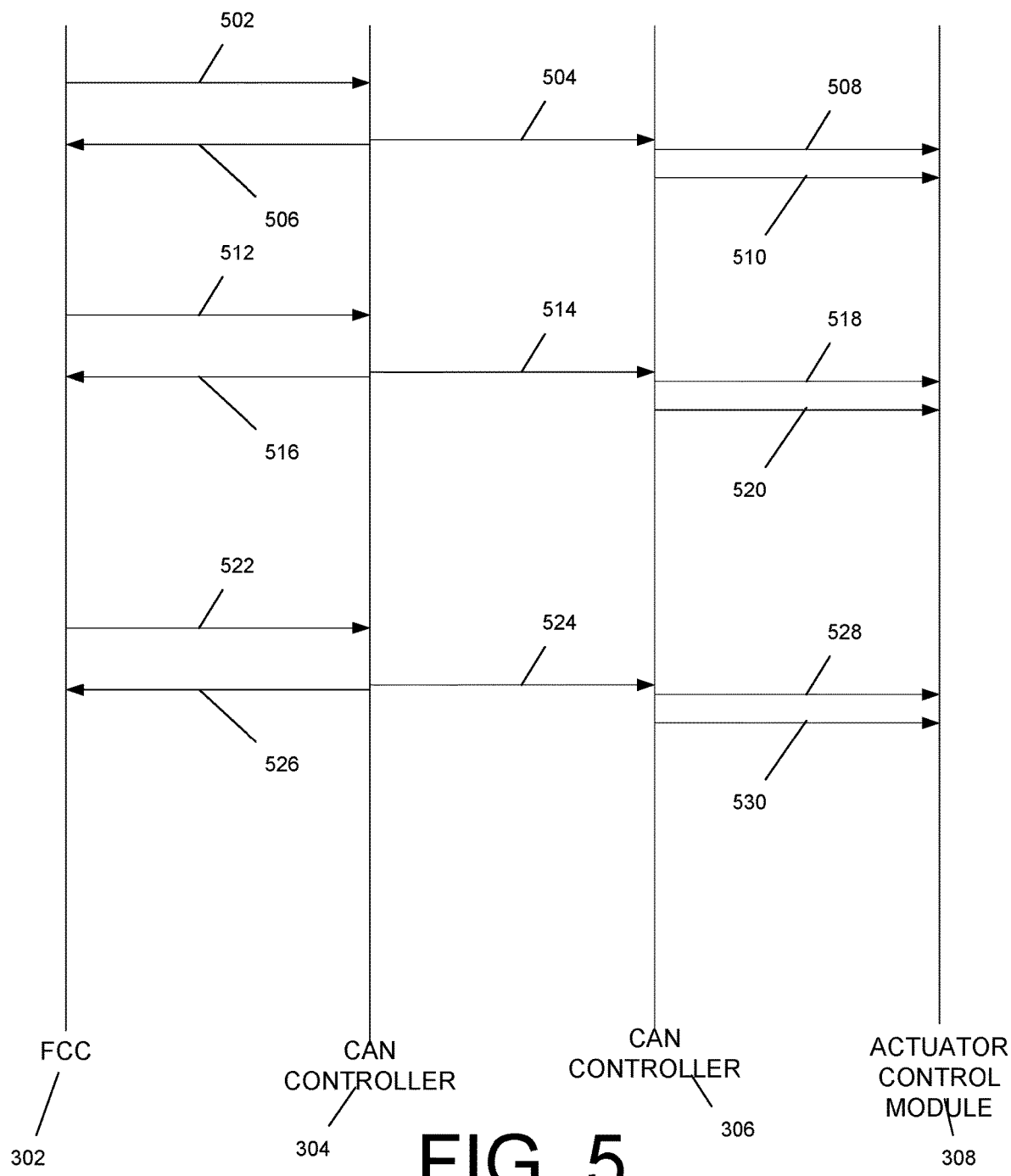
FIG. 5 depicts a sequence of communications within the synchronization system of FIG. 3 in connection with one or more exemplary implementations of the synchronization process of FIG. 4.

FIG. 5 depicts an exemplary sequence of communications within the synchronization system 300 of FIG. 3 in accordance with an exemplary embodiment of the synchronization process 400 of FIG. 4. The reference timekeeper flight control computer 302 transmits or otherwise provides 502, to its CAN controller 304, an initial synchronization message (e.g., task 402). Thereafter, when the CAN controller 304 transmits 504 the synchronization message over the CAN bus 310, the CAN controller 304 generates an interrupt signal that is received 506 by the reference timekeeper flight control computer 302. In response to the interrupt signal 506, the reference timekeeper flight control computer 302 assigns the current value of its local clock as a transmit time timestamp associated with the transmitted synchronization message 504 (e.g., task 404). In exemplary embodiments, the synchronization message is configured with an arbitration ID or other message identifier that identifies the message as a synchronization message to be listened for, monitored for, subscribed to, or otherwise received by the various other control modules coupled to the CAN bus that would like to synchronize their clock domains with the source or producer of the synchronization message (e.g., for propeller synchrophasing). When a final bit of the synchronization message is received by CAN controller 306, the CAN controller 306 generates an interrupt signal indicating receipt of a message that is received 508 by the actuator control module 308 prior to the actuator control module 308 receiving the entirety of the synchronization message 510. In response to the interrupt signal 508, the actuator control module 308 assigns the current value of its local clock as a receipt time timestamp associated with the synchronization message 504 (e.g., task 406).

After a resynchronization time period has elapsed, the reference timekeeper flight control computer 302 transmits or otherwise provides 512, to its CAN controller 304, a subsequent synchronization message that includes in its payload indication of the transmit time timestamp associated with the interrupt 506 corresponding to transmission of the preceding synchronization message 504 (e.g., task 402). Thereafter, when the CAN controller 304 transmits 514 the subsequent synchronization message over the CAN bus 310, the CAN controller 304 generates an interrupt signal that is received 516 by the reference timekeeper flight control computer 302, which assigns the current value of its local clock as a transmit time timestamp associated with the transmitted synchronization message 514 (e.g., task 404). When a reference bit of the subsequent synchronization message is received by CAN controller 306, the CAN controller 306 generates an interrupt signal indicating receipt of a message that is received 518 by the actuator control module 308 prior to the actuator control module 308 receiving the entirety of the synchronization message 520. In response to the interrupt signal 518, the actuator control module 308 assigns the current value of its local clock as a receipt time timestamp associated with the subsequent synchronization message 504 (e.g., task 406).

After receiving the entirety of the synchronization message 520, the actuator control module 308 analyzes the payload of the subsequent synchronization message to identify the transmit time timestamp associated with the preceding synchronization message 504 (e.g., the time of interrupt signal 506 in the reference timekeeper domain) and then calculates or otherwise determines an offset for adjusting its local clock domain based on the difference between the transmit time timestamp associated with the preceding synchronization message in the reference timekeeper clock domain and the receipt time timestamp associated with the generated interrupt signal 508 for the preceding synchronization message 504 (e.g., task 408). Thereafter, the actuator control module 308 utilizes the determined offset amount to adjust the value of its local clock to obtain an adjusted reference clock value that is substantially synchronized with the current value of the reference clock value at the flight control computer 302.

Although not illustrated in FIG. 5, during the resynchronization time period between synchronization messages, the flight control computer 302 may periodically transmit or otherwise provide synchrophasing actuation commands to the actuator control module 308 that include or otherwise specify a commanded rotational speed for a propeller, rotor or other flight control component associated with the actuator control module 308 along with a commanded phase angle offset at a particular commanded point in time referenced to the reference clock domain at the flight control computer 302. The actuator control module 308 utilizes the adjusted reference clock value locally maintained the actuator control module 308 to control or otherwise operate one or more actuators to actuate the propeller, rotor or other flight control component associated with the actuator control module 308 to the commanded phase angle offset when the value of the adjusted reference clock at the actuator control module 308 is equal to the commanded point in time in the reference clock domain for that phase angle offset. In this regard, by virtue of the adjusted reference clock maintained the actuator control module 308 being substantially synchronized to the reference clock domain at the flight control computer 302, the commanded phase angle offset is achieved at the particular commanded point in time or within a threshold amount of time error such that destructive interference may still be achieved.

As depicted in FIG. 5, after another resynchronization time period has elapsed, the reference timekeeper flight control computer 302 transmits or otherwise provides 522 another synchronization message that includes in its payload indication of the transmit time timestamp associated with the interrupt 516 corresponding to transmission of the preceding synchronization message 514. Thereafter, when the CAN controller 304 transmits 524 the subsequent synchronization message over the CAN bus 310, the CAN controller 304 generates an interrupt signal 526 used by the reference timekeeper flight control computer 302 to assign a transmit time timestamp to the transmitted synchronization message 524. When a reference bit of the subsequent synchronization message is received by CAN controller 306, the CAN controller 306 generates an interrupt signal 528 utilized by the actuator control module 308 assigns a receipt time timestamp to the message 524. The actuator control module 308 analyzes the payload of the received synchronization message 530 to identify the transmit time timestamp associated with the preceding synchronization message 514 (e.g., the time of interrupt 516 in the reference timekeeper domain) and then calculates or otherwise determines an updated offset for adjusting its local clock domain based on the difference between the transmit time timestamp associated with the preceding synchronization message in the reference timekeeper clock domain and the receipt time timestamp associated with the generated interrupt signal 518 for the preceding synchronization message 514. In this manner, the offset amount may be dynamically adjusted over time to compensate for variations or deviations between different clock domains to maintain the adjusted reference clock at the actuator control module 308 substantially in sync with the reference clock at the flight control computer 302.

It should be noted that although the subject matter is described herein primarily in the context of synchronization between a flight control computer or other vehicle control module and an actuator control module, in practice, the subject matter described herein may be implemented in an equivalent manner between flight control computers or vehicle control modules, which, in turn, results in one of the flight control computers broadcasting or otherwise providing notification of a clock domain adjustment to the respective actuator control modules. For example, a reference timekeeper flight control computer 110 may transmit or otherwise provide synchronization messages received by another one of the flight control computers 112, which, in turn, broadcasts or otherwise transmits indicia of when the synchronization messages were received. The actuator control modules may utilize the receipt time timestamps broadcast by the flight control computer 112, individually or in combination with transmit and receipt timestamps obtained locally at the respective actuator control module, to determine a corresponding adjustment for its local clock domain that is influenced by the receipt timestamp broadcast by one of the flight control computers 112 other than the reference timekeeper flight control computer 110.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An electrical system suitable for use with a vehicle, the electrical system comprising:
    a communications bus;
    a bus control module coupled to the communications bus to transmit a first message over the communications bus and provide an indication of the first message being transmitted;
    a first control module coupled to the bus control module to identify a first timestamp associated with the indication in a first clock domain associated with the first control module and provide a subsequent message to the bus control module including the first timestamp; and
    a second control module coupled to the communications bus to identify a second timestamp associated with the first message being received over the communications bus, identify the first timestamp contained in the subsequent message, and determine an adjustment to synchronize a second clock domain associated with the second control module based at least in part on a relationship between the first timestamp and the second timestamp, wherein the first control module is configured to provide a command message including a phase angle offset for synchrophasing a propeller coupled an actuator coupled to the second control module at a specified point in time in the first clock domain over the communications bus and the second control module is configured to determine an adjusted time in the second clock domain using the specified point in time and the adjustment and actuate the actuator to a commanded position corresponding to the phase angle offset for the propeller at the adjusted time in the second clock domain.

2. The electrical system of claim 1, further comprising a second bus control module coupled between the communications bus and the second control module to provide a second indication of the first message being received, wherein the second control module identifies the second timestamp associated with the second indication in the second clock domain.

3. The electrical system of claim 2, wherein:
    the indication of the first message being transmitted comprises a first interrupt signal generated by the bus control module in response to transmitting at least a portion of the first message; and
    the second indication of the first message being received comprises a second interrupt signal generated by the second bus control module in response to receiving at least a second portion of the first message.

4. The electrical system of claim 3, wherein the second control module determines the adjustment based on a difference between the first timestamp associated with the first interrupt signal and the second timestamp associated with the second interrupt signal.

5. The electrical system of claim 4, wherein the adjustment comprises an offset to a current value of the second clock domain at the second control module.

6. The electrical system of claim 1, wherein the communications bus comprises an asynchronous bus.

7. The electrical system of claim 1, wherein the communications bus comprises a controller area network (CAN) bus.

8. The electrical system of claim 7, wherein the bus control module comprises a CAN controller.

9. The electrical system of claim 8, wherein the first control module comprises a flight control computer.

10. The electrical system of claim 1, wherein a rotational speed of the propeller is greater than 100 Hertz (Hz).

11. The electrical system of claim 10, wherein a data rate of the communications bus is 1 megabit per second (Mbps) or less.

12. The electrical system of claim 1, further comprising:
    a second communications bus; and
    a second flight control computer coupled to the second control module over the second communications bus to provide a redundant command message including the phase angle offset for synchrophasing the propeller to the second control module over the second communications bus, wherein the first control module comprises a reference timekeeper flight control computer.

13. The electrical system of claim 12, wherein the second control module is configured to determine the adjustment to synchronize the second clock domain associated with the second control module based at least in part on a receipt timestamp broadcast by the second flight control computer.

14. A method comprising:
    receiving, by a first control module coupled to an asynchronous bus, a first synchronization message over the asynchronous bus from a second control module coupled to the asynchronous bus;

identifying, by the first control module, a first timestamp associated with receipt of the first synchronization message in a first clock domain associated with the first control module;

receiving, by the first control module, a second synchronization message over the asynchronous bus from the second control module, the second synchronization message including a second timestamp associated with transmission of the first synchronization message in a second clock domain associated with the second control module;

determining, by the first control module, an adjustment to synchronize the first clock domain with the second clock domain based on a relationship between the first timestamp and the second timestamp; and operating, by the first control module, a propeller to a commanded phase angle at an adjusted time in the first clock domain corresponding to a specified point in time in the second clock domain based on the adjustment.

15. The method of claim 14, wherein determining the adjustment comprises calculating an offset to be applied to a current time value in the first clock domain to be equal a reference time value in the second clock domain.

16. The method of claim 14, wherein a bus control module is coupled between the first control module and the asynchronous bus, wherein identifying the first timestamp comprises the first control module recording a time value in the first clock domain when an interrupt signal is generated by the bus control module in response to receiving at least a portion of the first synchronization message over the asynchronous bus.

17. The method of claim 16, wherein a second bus control module is coupled between the second control module and the asynchronous bus, wherein the second timestamp comprises a recorded time value in the second clock domain when a second interrupt signal is generated by the second bus control module in response to transmitting at least a second portion of the first synchronization message over the asynchronous bus.

18. A computer-readable medium having computer-executable instructions stored thereon that, when executed by a processing system, cause the processing system to:

identify a first timestamp in a first clock domain associated with a first control module corresponding to transmission of a synchronization message over an asynchronous bus;

identify a second timestamp in a second clock domain associated with a second control module corresponding to receipt of the synchronization message over the asynchronous bus; and determining an offset to synchronize the second clock domain with the first clock domain based on a relationship between the first timestamp and the second timestamp, resulting in an adjusted reference time in the second clock domain, wherein an actuator coupled to the second control module is operated in accordance with the adjusted reference time and the second control module operates the actuator to actuate a propeller to a commanded phase angle offset at a specified point in time in the first clock domain using the adjusted reference time.

19. The computer-readable medium of claim 18, wherein the asynchronous bus comprises a controller area network (CAN) bus.

20. The computer-readable medium of claim 19, wherein the first control module comprises a flight control computer and the second control module comprises an actuator control module.

* * * * *